G. J. HICKS.
PROOFING MACHINE.
APPLICATION FILED APR. 16, 1912.
1,127,000.
Patented Feb. 2, 1915.
3 SHEETS—SHEET 1.
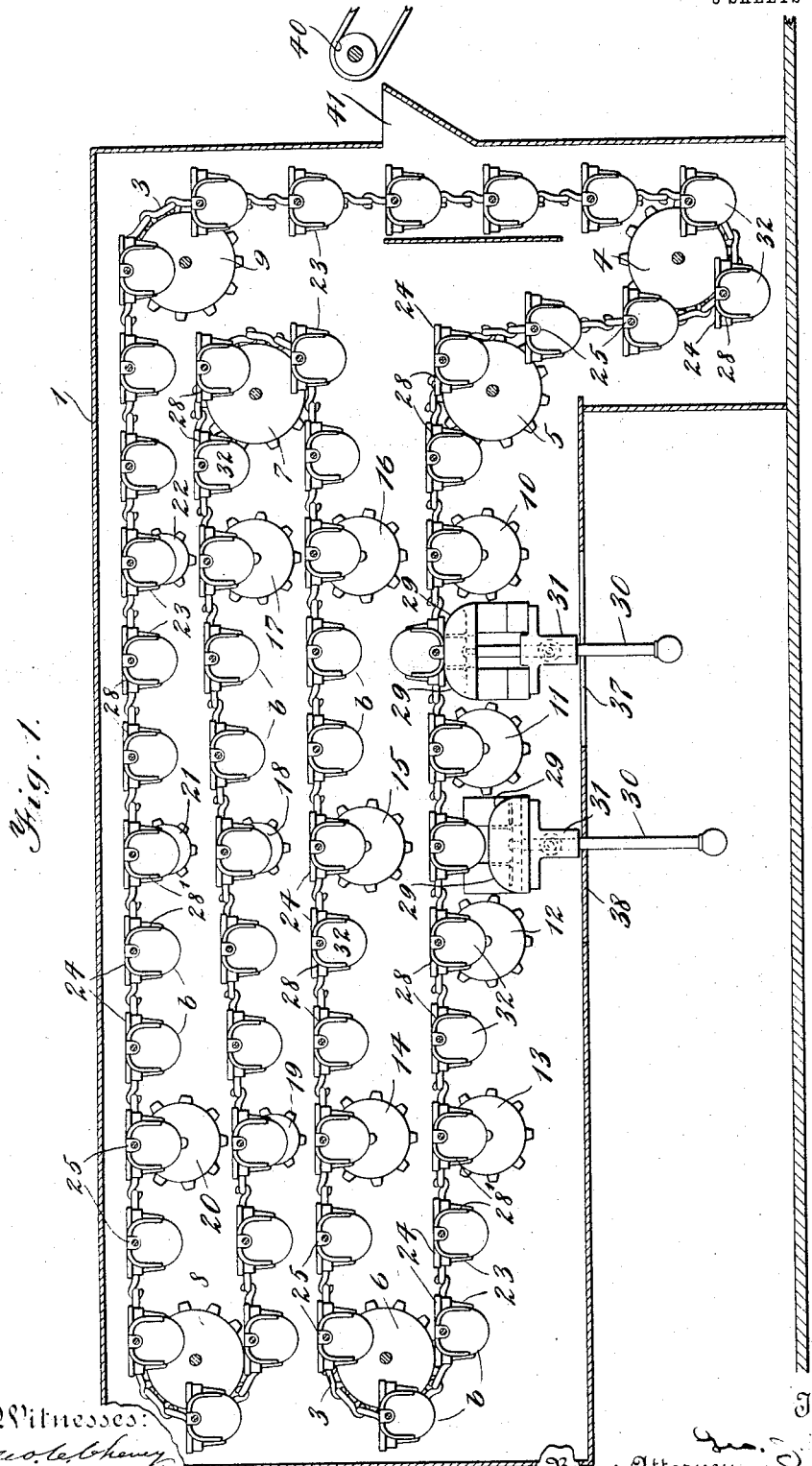

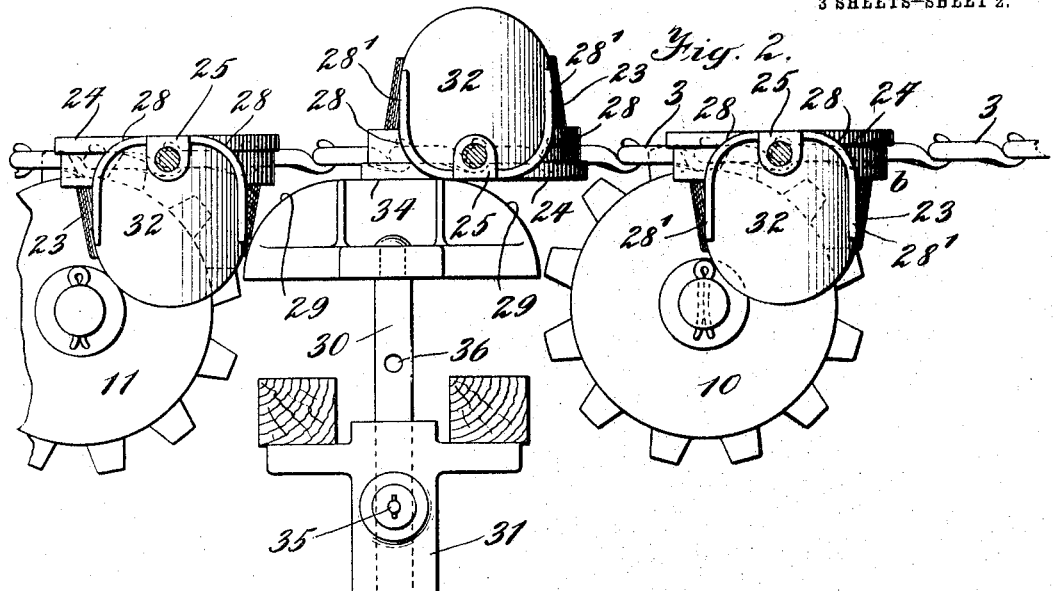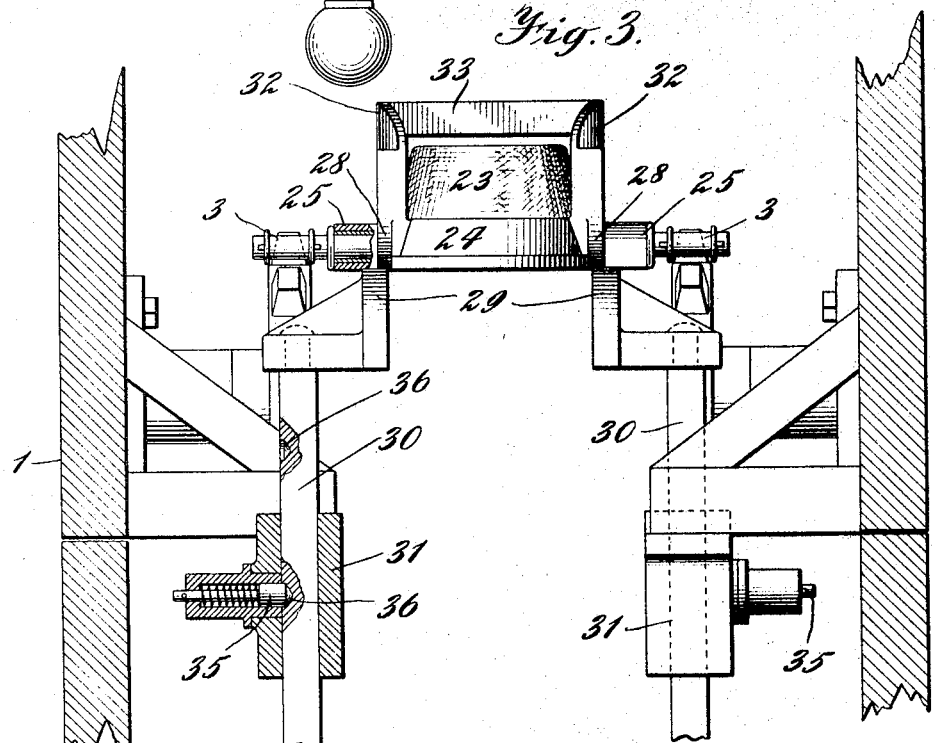

G. J. HICKS.
PROOFING MACHINE.
APPLICATION FILED APR. 16, 1912.
1,127,000.
Patented Feb. 2, 1915.
3 SHEETS—SHEET 3.
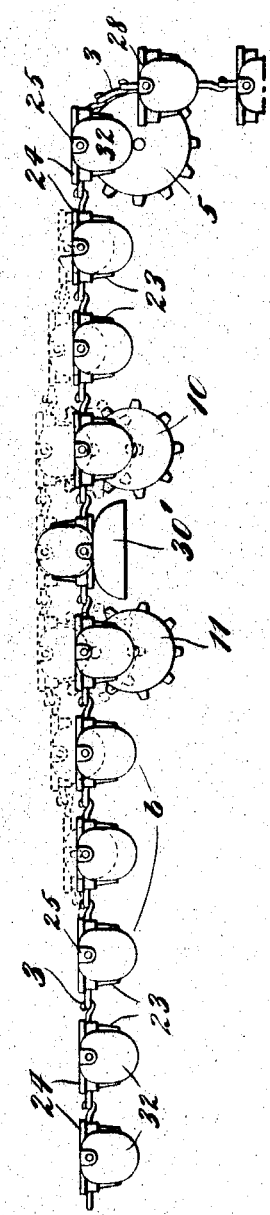
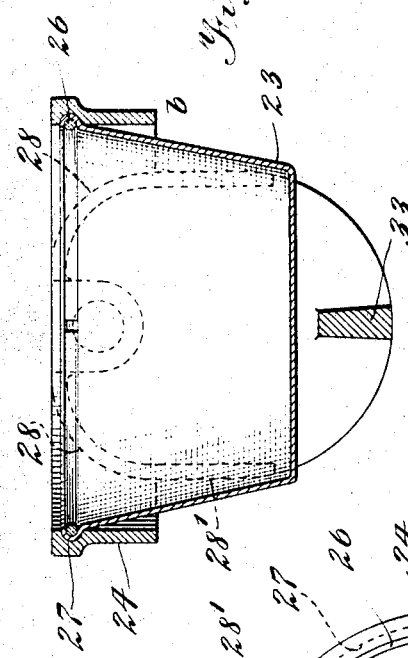
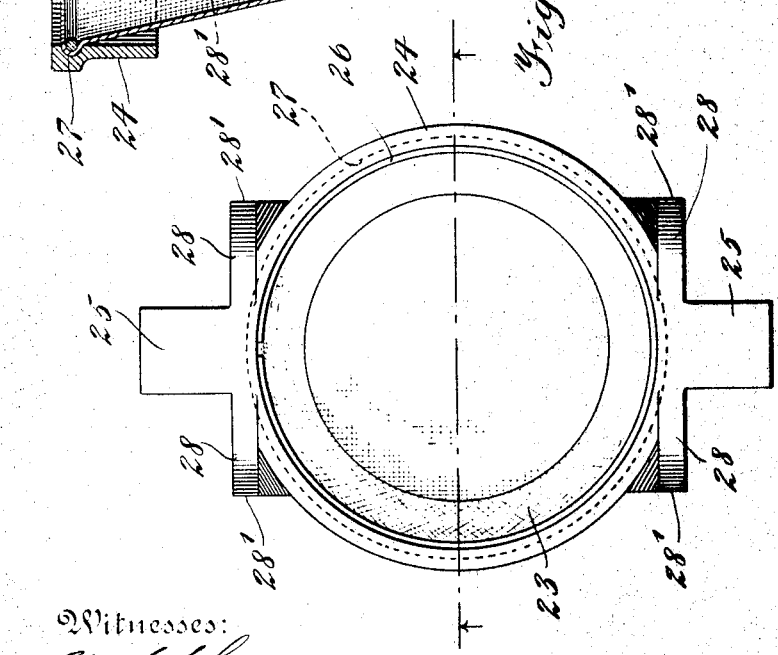

UNITED STATES PATENT OFFICE.

GEORGE J. HICKS, OF SAGINAW, MICHIGAN, ASSIGNOR TO RICHARD & OTTO WERNER, OF CANNSTATT, GERMANY.

PROOFING-MACHINE.

1,127,000.  Specification of Letters Patent.  Patented Feb. 2, 1915.

Application filed April 16, 1912. Serial No. 691,210.

*To all whom it may concern:*

Be it known that I, GEORGE J. HICKS, citizen of the United States, and resident of Saginaw, in the county of Saginaw and State of Michigan, have invented certain new and useful Improvements in Proofing-Machines, of which the following is a specification.

This invention relates particularly to dough-proofing machines for use in the treatment of dough for making bread, etc.

In the making of bread by machinery it is customary after the ingredients have been mixed and the dough properly kneaded, to deliver it from a dough-trough to a dough-divider in which the mass of dough is divided into pieces of proper size for making the loaves. From the dough-divider these pieces are delivered to a rounding-up machine in which the cut cells of the dough are closed up and which serves to shape each piece of dough to a certain extent. From the rounding-up machine it is customary to deliver these pieces of dough to some proofing device for the purpose of giving the dough an opportunity to expand while substantially at rest.

Many different types of devices for proofing dough that has been worked to such an extent as to retard the action of the yeast have been employed. One type of machine suitable for the purpose of permitting the proper expansion and proofing of individual pieces of dough is shown in my prior application Serial No. 527,609, filed November 12, 1909.

The principal object of my present invention is to provide an improved type of dough-proofing machine in which the divided and rounded-up pieces of dough may be more thoroughly and uniformly proofed than in apparatus of this kind heretofore constructed, in which each piece of dough will be maintained throughout its travel in the apparatus substantially in the form it has when received, and from which each piece may be readily delivered at any desired point and to any suitable means, usually a dough-molding machine, for further treatment of the dough.

One of the principal features that distinguishes my present invention from other dough-proofing machines is the employment of individual dough-buckets for individual pieces of dough, these buckets being so constructed and made of such material as to prevent the chilling of the dough during its travel through the apparatus and also serving to prevent sticking of the dough to the buckets.

A further important feature of the invention is the employment of means continuously movable at a substantially uniform rate of speed for feeding the pieces of dough, conveying them through the dough-proofing machine and delivering them to a suitable apparatus, such for example, as a dough-molding machine, without interruption of the regular and uniform travel of the dough-conveying elements.

Other features of the invention not hereinbefore referred to will be hereinafter described and claimed and are illustrated in the accompanying drawings in which, Figure 1 is a longitudinal section of a dough-proofing machine embodying my invention; Fig. 2 is an enlarged detail in side elevation of a portion of the dough-conveyer of the machine in operative relation with means for dumping the buckets of the conveyer; Fig. 3 is an end elevation of the same; Fig. 4 is a substantially central longitudinal section of one of the buckets and its carrier shown on a still larger scale; Fig. 5 is a plan of the same, and Fig. 6 is a side elevation illustrating a portion of a dough-proofing machine having a modified type of means for controlling the discharge of the individual pieces of dough from the conveyer.

Similar characters designate like parts in all the figures of the drawings.

One of the main features of a dough-proofing machine constructed in accordance with my present invention is a series of buckets each adapted to contain a separate piece of dough, and all mounted on suitable means for carrying them for the predetermined length of time in a closed chamber for the purpose of properly proofing the dough. In connection with this means suitable means will also usually be employed for automatically feeding charges of dough to the individual buckets of the series, and other means will also preferably be employed for automatically discharging the charges of dough from the buckets aforesaid after these charges have been properly proofed.

The proofing chamber within which the charges of dough are moved by the means just described is formed by a suitable casing, such for example, as that indicated at 1, which in the present instance surrounds practically all of the operative parts of the machine. The means for moving the individual pieces of dough through this chamber may be of any suitable type provided it is adapted to receive and convey individual pieces of dough without interruption of the movement of the conveying means. Preferably the means employed for carrying the pieces of dough in their course through the chamber 1 is an endless conveyer which may be formed by any suitable means, but preferably by a pair of sprocket-chains, such as 3, mounted to travel on any suitable supports and in any desired manner. In the construction illustrated there is a series of sprocket-wheels of various diameters, according to the work to be done by them, which support these sprocket-chains substantially throughout their length. At each of the points at which the sprocket-chains make a turn to change their course large sprocket-wheels, such as 4, 5, 6, 7, 8 and 9, are shown; while at intermediate points where the sprocket-wheels serve mainly to support the load smaller sprocket-wheels, such as 10, 11, 12, 13, 14, 15, 16, 17, 18, 19, 20, 21 and 22, are illustrated. Of course the number of devices over or around which the conveyer passes is immaterial except that they should be sufficient for the purpose of properly supporting the conveyer and controlling its movements.

The preferred construction of the conveyer and of the buckets for containing the pieces of dough is illustrated in detail in Figs. 2 to 5 inclusive. In these it will be seen that the conveyer consists substantially of two sprocket-chains traveling on the supports or sprocket-wheels before referred to and supporting at intervals dough-buckets adapted to receive individual pieces of dough at successive points in the continuous travel of the conveyer. Here each dough-bucket is preferably supported on the conveyer in such a manner as to be capable of movement not only therewith but relatively thereto, this movement being in the present construction about a pivot on which each bucket tilts or turns to discharge the piece of dough contained therein.

Each dough-bucket is preferably substantially of the type illustrated in detail in these figures. It comprises, in the preferred construction, a bucket-carrier and a bucket proper attached to that carrier. The bucket proper, however, is also preferably detachable from the bucket-carrier and made of a different material, and one more suitable for contact with dough. The dough-bucket is designated generally by b. Its two main parts as illustrated herein are the bucket proper, designated generally by 23, and a bucket-carrier, designated generally by 24. This bucket-carrier, as shown, is an annular metallic member and has at its opposite sides trunnions for pivotally connecting it with the opposite sprocket-chains 3 of the conveyer. The trunnion connections between these bucket-carriers and the chains 3 are designated generally by 25. They may be any suitable for permitting tilting of the bucket-carriers and buckets to a position suitable for discharging the dough contained in the buckets. As shown, the connections are such as to permit complete rotation of each bucket and its carrier, as will be evident by referring particularly to Figs. 2 and 3. Each of the trunnion connections shown comprises a journal member secured to one of the chains 3 and a projecting bearing on the bucket-carrier into which bearing the journal member extends, the journal being preferably properly bushed to reduce wear.

The bucket proper is in each instance made of material that is a poor conductor of heat, it preferably being a textile fabric such as canvas. Material of this kind has several important advantages over a metallic bucket. In the first place its temperature is neutral and the piece of dough delivered into it is not chilled by contact with it. In the second place when the material is such a fabric as canvas it is capable of retaining flour within the meshes of the fabric and thus preventing sticking of the dough to the bucket. Both of these are matters of much importance in a machine of this class. The bucket made from such material as this is, when in its normal position, substantially in the form of a frustum of a cone, the base of which constitutes the mouth or receiving portion of the bucket. When a piece of dough is dropped into it while the bucket is properly supported this bucket readily takes the shape substantially of a half sphere which is a good shape for handling and also facilitates the raising of the dough. It will be obvious, of course, that when a piece of dough is dropped into a bucket of this kind it will quickly take the shape just described and will retain that shape throughout its travel in the proofing chamber. Of course all of the other pieces of dough, being contained in the corresponding buckets, will take the same shape and all will be substantially uniform in shape and will be acted on substantially uniformly throughout the mass thereof throughout their travel in the proofing apparatus. For the purpose of holding this canvas bucket 23 in place on the bucket-carrier 24 any suitable connecting or attaching means may be employed. Preferably the bucket is detachably connected to the carrier 24 as, for example, by means of a strong stiff annular spring, such as 26, adapted to be snapped into a suitable depression or groove, such as 27, in the inner wall of the annular portion of the carrier 24. By means of this strong annular spring the upper portion or rim of the canvas bucket 23 may be securely fastened to the carrier 24 at all points in said rim, while readily detachable from the carrier when desired.

In the machine shown the conveyer is so constructed as to permit the buckets to turn freely between the two parallel sprocket-chains, or their equivalent, to discharge the pieces of dough from the buckets. By referring to Fig. 3 it will be seen that there is a wide space between these two sprocket-chains sufficient to permit the discharge of the dough from the buckets without interference from any part of the mechanism.

For the purpose of discharging the pieces of dough at a suitable point in the path of movement of the buckets, any suitable means may be employed for tilting the buckets while they are traveling in the chamber 1. In Figs. 1, 2 and 3 one type of tripping device suitable for the purpose is shown. In Fig. 6 a modification of the means shown in Figs. 1, 2 and 3 is illustrated for controlling the dumping of the charges of dough from the buckets. In the construction illustrated in Figs. 1 to 3 inclusive the tripping means embodies two main elements, one of which is carried by a bucket and movable with it while the other is localized and is disposed in the path of travel of the coöperative element on the bucket. These two coöperative elements may be any suitable for the purpose, but are preferably cams secured respectively to the buckets and to suitable points on the fixed frame-work of the apparatus. It is of course only necessary that these elements shall serve to tilt or turn the buckets sufficiently to discharge the dough therefrom, but preferably they will serve to turn each bucket at the proper point and cause it to make a complete rotation about its axis in its supporting trunnions. Moreover, each element is preferably so formed as to tilt or turn the bucket gradually and smoothly without unnecessary jarring and straining of the parts. The specific means illustrated for the purpose embodies co-acting cams, such as 28 and 29, the cams 28 being formed on the bucket-carriers 24 while the cams 29 are formed on localized trips, 30, supported on the frame-work designated generally by 31. It will be noticed that the cams 28 have a regular curvature and begin and end in substantially straight portions, 28'. These come in contact with the cam surfaces 29 before the curved surfaces 28 do and leave the opposite cam faces 29 after the opposite surfaces 28 do, all of these faces being so shaped and coöperating in such a manner as to bring about a gradual turning of each bucket upon its axis for the purpose of discharging the dough, and a corresponding smooth and gradual turning of the bucket upon the same axis in returning to its normal dough-receiving position from the discharging position shown in Figs. 2 and 3.

The cam surfaces 28 and their extensions 28' are preferably formed in substantially vertical extensions or wings projecting from the annular portions of the bucket-carriers. In the construction illustrated there are two of these projections or wings for each bucket-carrier, said projections being designated herein by 32. The object of this is to assure a smooth and even movement of each bucket and bucket-carrier without opposing unnecessary resistance during the turning of the buckets. The cams 28 and their extensions 28' are preferably formed in pairs, the pairs at one side of each bucket being substantially identical with those at the other side. At the bottoms of the various bucket-carriers 24 the extensions or wings 32 are preferably connected by a substantially central bar, such as 33, the principal function of which is to provide sufficient weight to balance the bucket properly in its travel through the machine. This cross-bar assures the proper positioning of each bucket with the top of the bucket level as it travels with the conveyer and also causes it to swing freely and not hang sidewise in traveling. It also constitutes a support for the bottom of the canvas bucket 23 when this is heavily loaded.

In order that power may be applied to the buckets at opposite sides thereof to tilt them positively at both of these points, the localized tripping means before referred to also preferably has duplicate parts coöperative respectively with the opposite cams or pairs of cams 28 etc. In the construction shown in Figs. 2 and 3 the localized tripping means comprises two trip devices, preferably identical in construction, one of which coöperates with the surfaces 28 and 28' at one side of the buckets, and the other of which coöperates with the corresponding faces at the opposite side of said buckets. These two devices are indicated at 30 and have the cam faces 29, before described, which merge in a substantially flat face 34. The trip devices shown are substantially T-shaped members as viewed in side elevation, and are movable up and down in substantially vertical guides in the frame-work 31. They may be held either in or out of operative relation with the faces 28 and 28' of the buckets according as it is or is not desired to dump said buckets at a point adjacent to said trip devices. Here each trip device has a simple detent, such as a spring-pressed pin 35, adapted to enter one of several openings, 36, in the vertical portion of the trip device and hold it either elevated in the path of the cam faces 28, etc., or lowered out of the path of said faces, as shown at one point in Fig. 1.

An important feature of the invention is that the buckets may be automatically discharged at any one of a plurality of different points in the path of travel of the conveyer. This is illustrated in Fig. 1 where I have shown two trip devices 30 of the type just described, one of which (that at the right) is in the position shown in Figs. 2 and 3, and in such position coöperates with the buckets successively for dumping or discharging them when they reach said trip device, while the other of said devices is shown as lowered to its inoperative position in which its cam faces 29 do not coöperate with cam faces 28' of the buckets. Thus the buckets pass freely over and beyond the trip device 30 at the left in Fig. 1 and are not acted upon by it but are tilted and completely rotated about their axes one at a time as they reach the trip device 30 at the right in said view. This feature is one of importance as it is highly desirable in plants for handling dough automatically to provide for the delivery of pieces of dough of different size or weight to different molding machines at different times. Thus in one run of this dough-proofing machine one-pound pieces of dough may be conveyed by the buckets and discharged therefrom at one point in the travel of the conveyer by one trip device located at that point, while on another run of the machine two-pound pieces of dough, for example, may be handled and may be discharged from said buckets into a different dough molding machine by the action of another trip device located at a different point in the travel of the conveyer. There, of course, may be as many different points of discharge into as many different molding machines as desired. At 37 I have shown a discharge opening through the lower wall of the casing, through which opening the pieces of dough may be delivered one at a time to a suitable molding machine or other receiving means (not shown) located below said opening. This opening may be covered and uncovered by means of a slide, such as 38, which in one of its positions uncovers the opening 37, as shown, and in the other of its positions closes said opening and uncovers a similar opening for the discharge of the dough by the trip device 30 at the left in Fig. 1.

It will be evident from the foregoing description of my improved dough-proofing machine for handling individual pieces of dough in buckets, and for keeping them in constant and regular motion throughout their travel in the dough-proofing chamber, that when a conveyer of the endless belt or chain type, such as shown, is employed the dough-proofing machine may be readily adapted to the local conditions and requirements of any bakery, as the dough may be received by the buckets at any point on any floor of the bakery and conveyed to and discharged at any desired point on the same floor or on any other floor of the bakery, and in its travel may be conveyed from one point to another by a movement horizontally or vertically, or in any other proper path. Moreover, it will be clear that the length of the conveyer and the speed of operation thereof may be varied as desired to adjust the apparatus for any desired length of time that the pieces of a given batch of dough should be held in the proofing chamber. In the construction illustrated in Fig. 1 the dough is delivered by a suitable feed device, such as 40, into the receiving opening, such as 41, of the dough-proofing chamber 1 and individual pieces are delivered one at a time into the buckets 23. It will be understood that the speed of travel of these buckets and the movement of the feed device 40 should be so related that the feed device will deliver the pieces of dough successively to said buckets in proper timing as said buckets come into the proper position, adjacent to the opening 41, for receiving the dough.

In Fig. 6 I have illustrated a modification of the invention in which the conveyer and the buckets carried thereby are the same as those shown in the other views, but the means employed for controlling the discharge of the pieces of dough from the buckets differs considerably from that before described. In this view the localized tripping means, which may be of any suitable construction, and is shown as similar to that before described, is fixed, as illustrated at 30, and the conveyer with its buckets is so mounted as to be movable as a whole at a point adjacent to the tripping means into and out of operative relation with said means. This relative movement is clearly illustrated by the dotted and full lines of the conveyer and its buckets, the full lines illustrating the path of travel of the conveyer when the buckets are to be discharged by the tripping means 30 while the dotted lines show the course taken by the conveyer and its buckets in and near the zone of discharge when the buckets are not to be dumped in said zone. The shifting of the conveyer and its buckets bodily out of operative relation with the tripping means 30 may be effected by any suitable mechanism (not shown) for elevating the supporting sprocket-wheels 10 and 11 over which the sprocket-chains pass adjacent to the tripping means 30. This, of course, is merely another of many means that may be employed for bringing traveling and localized tripping elements into or out of operative relation for the purpose of controlling the discharge of the pieces of dough at any given point or points in their travel through the proofing chamber.

What I claim is:

1. In a machine of the character described and in combination, a traveling conveyer having a pair of parallel chains, an annular bucket-carrier having trunnions pivotally supported on the chains of said conveyer, and a bucket detachably secured to said bucket-carrier.

2. In a machine of the character described and in combination, a traveling conveyer having a pair of parallel chains, an annular bucket carrier having trunnions pivotally supported on the chains of said conveyer, and a flexible bucket detachably secured to said bucket carrier.

3. In a machine of the character described and in combination, a traveling conveyer having a pair of parallel chains, an annular bucket carrier having trunnions pivotally supported on the chains of said conveyer, a flexible bucket secured to said bucket carrier, and means to tilt said bucket carrier to discharge the contents of the bucket.

4. In a machine of the class described, the combination of conveying means, a tiltable bucket carrier pivotally supported from said conveying means, and a flexible bucket supported by said carrier.

5. In a machine of the class described, the combination of conveying means, a tiltable bucket carrier pivotally supported from said conveying means, a flexible bucket supported by said carrier, and means to tilt said carrier to discharge the contents of the bucket.

Signed at Saginaw, in the county of Saginaw and State of Michigan, this 9th day of April, A. D. 1912.

GEORGE J. HICKS.

Witnesses:
G. A. HESSLOCHE,
O. E. HUPARL.